United States Patent
Fleming et al.

(10) Patent No.: US 6,172,810 B1
(45) Date of Patent: Jan. 9, 2001

(54) RETROREFLECTIVE ARTICLES HAVING POLYMER MULTILAYER REFLECTIVE COATINGS

(75) Inventors: Robert J. Fleming; Joseph M. McGrath, both of Lake Elmo; Christopher S. Lyons, St. Paul, all of MN (US)

(73) Assignee: 3M Innovative Properties Company, St. Paul, MN (US)

(*) Notice: Under 35 U.S.C. 154(b), the term of this patent shall be extended for 0 days.

(21) Appl. No.: 09/259,100

(22) Filed: Feb. 26, 1999

(51) Int. Cl.$^7$ ..................................... G02B 5/122

(52) U.S. Cl. ..................... 359/529; 359/530; 359/534; 359/536

(58) Field of Search ..................... 359/529, 530, 359/536, 538–540, 543, 584–589

(56) References Cited

U.S. PATENT DOCUMENTS

| | | |
|---|---|---|
| 1,175,224 | 3/1916 | Bleecker . |
| 2,214,369 | 9/1940 | Hammarbach . |
| 2,354,049 | 7/1944 | Palmquist . |
| 2,379,741 | 7/1945 | Palmquist . |
| 2,383,884 | 8/1945 | Palmquist . |
| 2,407,680 | 9/1946 | Palmquist et al. . |
| 2,440,584 | 4/1948 | Heltzer et al. . |
| 2,543,800 | 3/1951 | Palmquist . |
| 2,568,126 | 9/1951 | Keeley . |
| 3,684,348 | 8/1972 | Rowland . |
| 3,700,305 | 10/1972 | Bingham . |
| 3,700,478 | 10/1972 | Bingham . |
| 3,810,804 | 5/1974 | Rowland . |
| 4,025,159 | 5/1977 | McGrath . |
| 4,192,576 | 3/1980 | Tung et al. . |
| 4,310,584 | 1/1982 | Cooper et al. . |
| 4,588,258 | 5/1986 | Hoopman . |
| 4,648,932 | 3/1987 | Bailey . |
| 4,696,719 | 9/1987 | Bischoff . |

(List continued on next page.)

FOREIGN PATENT DOCUMENTS

| | | |
|---|---|---|
| 514223 | 11/1992 | (EP) . |
| 06347622 | 12/1994 | (JP) . |
| 6-347622 | 12/1994 | (JP) . |
| WO 95/17692 | 6/1995 | (WO) . |
| WO 95/31739 | 11/1995 | (WO) . |
| WO 96/31571 | 10/1996 | (WO) . |
| WO 97/01439 | 1/1997 | (WO) . |
| WO 97/01440 | 1/1997 | (WO) . |
| WO 97/37844 | 10/1997 | (WO) . |
| WO 98/18852 | 5/1998 | (WO) . |
| WO 98/50805 | 11/1998 | (WO) . |
| WO 99/36806 | 7/1999 | (WO) . |

OTHER PUBLICATIONS

John Affinito et al, "Vacuum deposited polymer/metal multilayer films for optical application," *Thin Solid Films*, 1995, pp. 43–48 (No Month).

Michael R. Chamberlain, "Optically variable devices and security printing, (part of a paper presented at Holopack Holoprint '95, New Orleans)" *Management and technology*, Dec. 1995, pp. 12–15.

J. A. Dobrowolski, F. C. Ho, and A. Waldorf, Research on thin film anticounterfeiting coatings at the National Research Council of Canada, *Applied Optics*, vol. 28, No. 14; Jul. 15, 1989; pp. 2702–2717.

*Primary Examiner*—James Phan
(74) *Attorney, Agent, or Firm*—Robert J. Pechman; Karl G. Hanson

(57) ABSTRACT

A retroreflective article that has a layer of optical elements and a multilayer reflective coating disposed on the optical elements. The reflective coating reflects light back into the optical elements so that it can be returned toward the light source. The multilayer reflective coating has multiple polymer layers and has layers that possess different refractive indices.

4 Claims, 4 Drawing Sheets

U.S. PATENT DOCUMENTS

| | | |
|---|---|---|
| 4,703,999 | 11/1987 | Benson . |
| 4,722,515 | 2/1988 | Ham . |
| 4,763,985 | 8/1988 | Bingham . |
| 4,775,219 | 10/1988 | Appledorn et al. . |
| 4,842,893 | 6/1989 | Yializis et al. . |
| 4,856,857 | 8/1989 | Takeuchi et al. . |
| 4,895,428 | 1/1990 | Nelson et al. . |
| 4,896,943 | 1/1990 | Tolliver et al. . |
| 4,938,563 | 7/1990 | Nelson et al. . |
| 4,954,371 | 9/1990 | Yializis . |
| 5,018,048 | 5/1991 | Shaw et al. . |
| 5,032,461 | 7/1991 | Shaw et al. . |
| 5,061,050 * | 10/1991 | Ogura ................................. 359/490 |
| 5,066,098 | 11/1991 | Kult et al. . |
| 5,097,800 | 3/1992 | Shaw et al. . |
| 5,125,138 | 6/1992 | Shaw et al. . |
| 5,260,095 | 11/1993 | Affinito . |
| 5,278,694 | 1/1994 | Wheatley et al. . |
| 5,339,198 | 8/1994 | Wheatly et al. . |
| 5,395,644 | 3/1995 | Affinito . |
| 5,422,756 * | 6/1995 | Weber ................................. 359/487 |
| 5,440,446 | 8/1995 | Shaw et al. . |
| 5,450,235 | 9/1995 | Smith et al. . |
| 5,454,919 | 10/1995 | Hill et al. . |
| 5,559,634 | 9/1996 | Weber . |
| 5,614,286 | 3/1997 | Bacon, Jr. et al. . |
| 5,691,846 | 11/1997 | Bacon, Jr. et al. . |
| 5,784,198 | 7/1998 | Nagaoka . |
| 5,812,317 | 9/1998 | Billingsley et al. . |
| 5,877,895 | 3/1999 | Shaw et al. . |

\* cited by examiner

RETROREFLECTIVE ARTICLES HAVING POLYMER MULTILAYER REFLECTIVE COATINGS

The present invention pertains to retroreflective articles that have a multilayer reflective coating that includes multiple polymer layers disposed in optical association with a layer of optical elements.

BACKGROUND

Retroreflective articles have the ability to redirect incident light back towards the light source. This unique ability has led to the wide-spread use of retroreflective articles on various substrates. For example, retroreflective articles can be used on flat inflexible substrates, such as road signs and barricades; on irregular surfaces, such as corrugated metal truck trailers, license plates, and traffic barriers; and on flexible substrates, such as road worker safety vests, a jogger's shoes, roll up signs, and canvas-sided trucks.

There are two major types of retroreflective articles: beaded articles and cube-corner articles. Beaded articles commonly use a multitude of glass or ceramic microspheres to retroreflect incident light. Typically, the microspheres are partially embedded in a support film, and a specular reflecting material is provided between the layer of microspheres and the support film. The reflecting material can be a metal layer (for example, an aluminum coating as disclosed in U.S. Pat. Nos. 3,700,478 and 4,648,932) or an inorganic dielectric mirror made up of multiple layers of inorganic materials that have different refractive indices (as disclosed in U.S. Pat. Nos. 3,700,305 and 4,763,985). Categories of beaded articles include exposed lens, enclosed lens, and encapsulated lens types. Exposed lens beaded articles have a layer of microspheres that are exposed to the environment. Enclosed lens beaded articles have a protective layer such as a transparent polymer resin contacting and surrounding the front side of the microspheres. Encapsulated lens articles have an air gap surrounding the front side of the microspheres and have a transparent film hermetically sealed to a support film to protect the microspheres from water, dirt, or other environmental elements.

In lieu of microspheres, cube-corner sheeting typically employs a multitude of cube-corner elements to retroreflect incident light. The cube-corner elements project from the back surface of a body layer. In this configuration, incident light enters the sheet at a front surface, passes through the body layer to be internally reflected by the faces of the cube-corner elements, and subsequently exits the front surface to be returned towards the light source. Reflection at the cube-corner faces can occur by total internal reflection when the cube-corner elements are encased in a lower refractive index media (e.g., air) or by reflection off a specular reflective coating such as a vapor deposited aluminum film. Illustrative examples of cube-corner sheeting are disclosed in U.S. Pat. Nos. 3,712,706; 4,025,159; 4,202,600; 4,243,618; 4,349,598; 4,576,850; 4,588,258; 4,775,219; and 4,895,428.

SUMMARY OF THE INVENTION

The present invention provides a new approach to supplying retroreflective articles with reflective coatings. In brief summary, the present invention provides a retroreflective article that comprises: (a) a layer of optical elements; and (b) a reflective coating that is disposed in optical association with the optical elements, the reflective coating comprising a plurality of layers wherein (i) at least two adjacent layers have different refractive indices, and (ii) the reflective coating includes multiple polymer layers that each have an average thickness that is less than about 10% of an average size of the optical elements.

Retroreflective articles of this invention differ from known retroreflective articles in that the optical elements have an associated reflective coating that comprises multiple polymer layers. The polymer layers can have indices of refraction and thicknesses selected such that the overall multilayer reflective coating reflects light in a desired wavelength range. Known retroreflective articles have used metal reflective layers, which in some instances can be subject to oxidation from air or moisture. When oxidized, the reflective layer can suffer a substantial loss in its reflective ability. Retroreflective articles have also employed multilayered inorganic dielectric mirrors that can be susceptible to air or moisture induced corrosion that can degrade reflectivity and/or lead to delamination of the layers. The polymer multilayer reflective coating of the present invention is beneficial in that it can be made highly reflective to light in a desired wavelength band(s), while also being capable of resisting undesirable environmental effects, such as air and/or moisture induced corrosion, to which known inorganic reflective coatings can be susceptible. The multilayer reflective coating of the present invention can also include inorganic and/or non-polymer layers disposed adjacent to or between the multiple polymer layers, for example, to help overcome limitations of known inorganic reflector coatings by rendering them more resistant to water, acids, bases, corrosion or other environmental degradation.

The above and other advantages of the invention are more fully shown and described in the drawings and detailed description of this invention. It is to be understood, however, that the description and drawings are for illustrative purposes and should not be read in a manner that would unduly limit the scope of the invention.

GLOSSARY

As used in this document, the following terms have the following definitions:

"Index of refraction" or "refractive index" is a material property that represents the ratio of the phase velocity of an electromagnetic wave in a vacuum to that in the material.

"Optical association" means the reflective coating is positioned relative to the optical elements such that a significant portion of light transmitted through the optical elements can strike the reflective coating and be reflected back into the optical elements.

"Optical elements" are light transmissive elements capable of altering the direction of light that enters the elements so that at least a portion of the light can ultimately be returned towards the light source. The "size" of an optical element refers to its characteristic width, depth, height, or length.

"Polymer layer" refers to a layer of material that includes organic molecules that have multiple carbon-containing monomer units that are linked in regular or irregular arrangements.

"Reflective coating" refers to a coating that is capable of reflecting incident light and that is made up of one or more layers of material.

"Retroreflective" means having the characteristic that obliquely incident incoming light is reflected in a direction antiparallel to the incident direction, or nearly so, such that an observer or detector at or near the light source can detect the reflected light.

DETAILED DESCRIPTION

Figure 1:
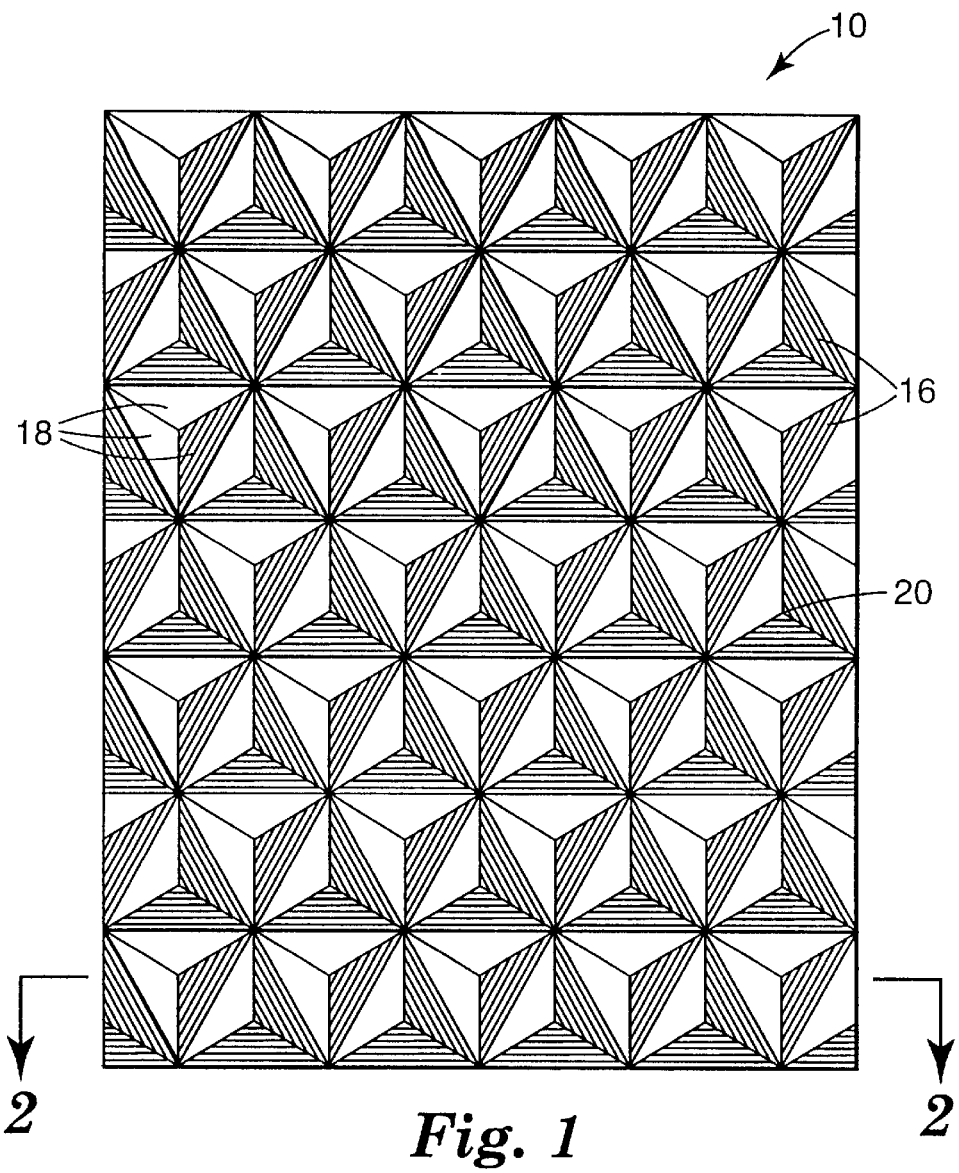
FIG. 1 is a plan view schematic representation of a portion of the backside of a cube-corner retroreflective article 10 in accordance with the present invention.

FIG. 1 shows a portion of a retroreflective article 10 that has a plurality of optical elements, which in this embodiment are shown as cube-corner elements 16, each defined by three faces 18 arranged to form a pyramidal shape. The cube-corner optical elements 16 are arranged as an ordered array and are shown to protrude out of the page of the drawing. The cube-corner elements 16 are disposed as matched pairs in an array on one side of the sheeting. Each cube-corner element 16 has the shape of a trihedral prism that has three exposed planar faces 18. The planar faces 18 may be substantially perpendicular to one another (as in the corner of a room) with the apex 20 of the prism vertically aligned with the center of the base. The angle between the faces 18 typically is the same for each cube-corner element in the array and is about 90°. The angle, however, can deviate from 90° as is well-known; see, for example, U.S. Pat. No. 4,775,219. Although the apex 20 of each cube-corner element 16 may be vertically aligned with the center of the base of the cube-corner element—see, for example, U.S. Pat. No. 3,684,348—the apex also may be canted to the center of the base as disclosed in U.S. Pat. No. 4,588,258. Thus, the present invention is not limited to any particular cube-corner geometry; however, of the many known cube-corner configurations (see, for example, U.S. Pat. Nos. 4,938,563; 4,775,219; 4,243,618; 4,202,600; and 3,712,706), the cube-corner sheeting described in U.S. Pat. No. 4,588,258 may be preferred because it provides wide angle retroreflection among multiple viewing planes.

Figure 2:
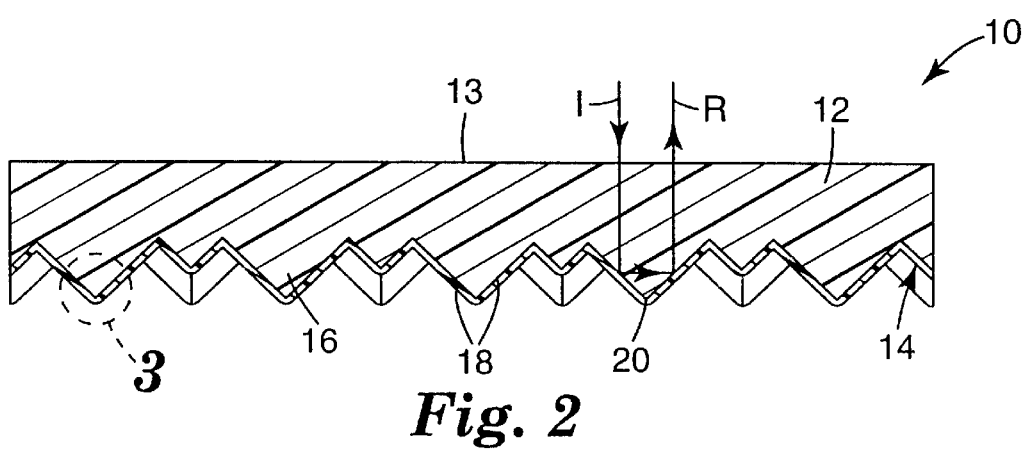
FIG. 2 is a cross-sectional representation of the cube-corner retroreflective article 10 shown in FIG. 1 taken along line 2—2.

FIG. 2 shows a cross-sectional representation of the retroreflective article 10 taken along line 2—2 of FIG. 1. Retroreflective article 10 has a body portion 12 from which the cube-corner elements 16 protrude. The body portion 12 has a front side 13 through which incident light I enters. A reflective coating 14 is disposed on the article 10 in optical association with the cube-corner elements 16. Incident light I reflects off cube-corner faces 18 and becomes redirected in the general direction of the incident beam, as indicated by reflected light beam R. A reflective coating 14 may increase the efficiency of reflections off the cube-corner faces 18 in some instances.

The body portion 12 and the optical elements 16 may be made from essentially any suitable light transmissible material. Preferably, the body portion and cube-corner elements comprise light transmissible polymers. This means that the polymer will allow light, particularly actinic radiation or visible light, to pass therethrough. Preferably the polymer is able to transmit at least 70 percent of the intensity of the light incident upon it at a given wavelength. More preferably, the polymers that are used in the retroreflective sheeting of the invention have a light transmissibility of greater than 80 percent, and more preferably greater than 90 percent.

Figure 3:
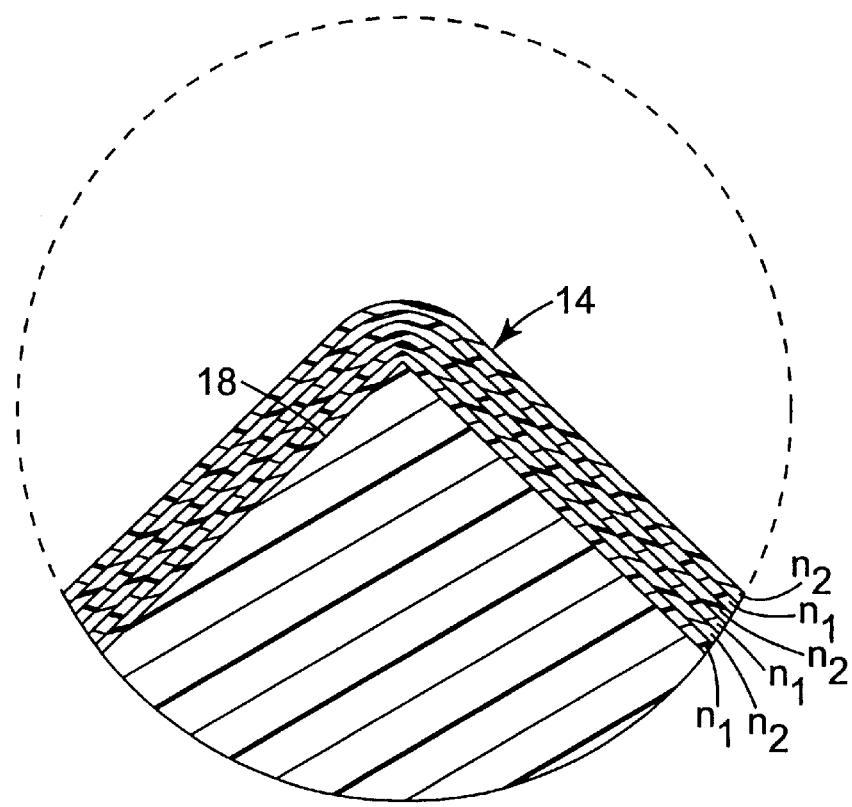
FIG. 3 is an enlarged inverted view of a portion of a cube-corner element 16 taken from region 3 of FIG. 2.

FIG. 3 shows a magnified view of the portion of the cube-corner element indicated by circle 3 in FIG. 2. Reflective coating 14 includes multiple polymer layers. For purposes of illustration, FIG. 3 shows a reflective coating 14 made up of six layers arranged as alternating layers of two different materials, at least one of which is a polymer, the materials having different refractive indices $n_1$ and $n_2$. Although six alternating layers of two different materials are shown in FIG. 3, the reflective coating can include two or more layers, and any suitable combination of two or more polymer layers. Preferably, the reflective coating has 2 to 200 layers, and more preferably 2 to 50 layers. For conformance to the profile of the cube-corner optical elements, it is preferred that each individual layer be thin relative to the cube-corner element heights (cube-corner heights measured from base to apex). The individual layers in the multilayer coating have thicknesses of less than about 10% of the cube-corner element height, more preferably less than about 5% of the cube-corner element height. In addition, the layers should have thicknesses that are appropriate for reflection of light in a desired wavelength range. The selection of layer thickness and refractive index of the materials in the multilayer reflective coating is discussed in more detail below.

Figure 4:
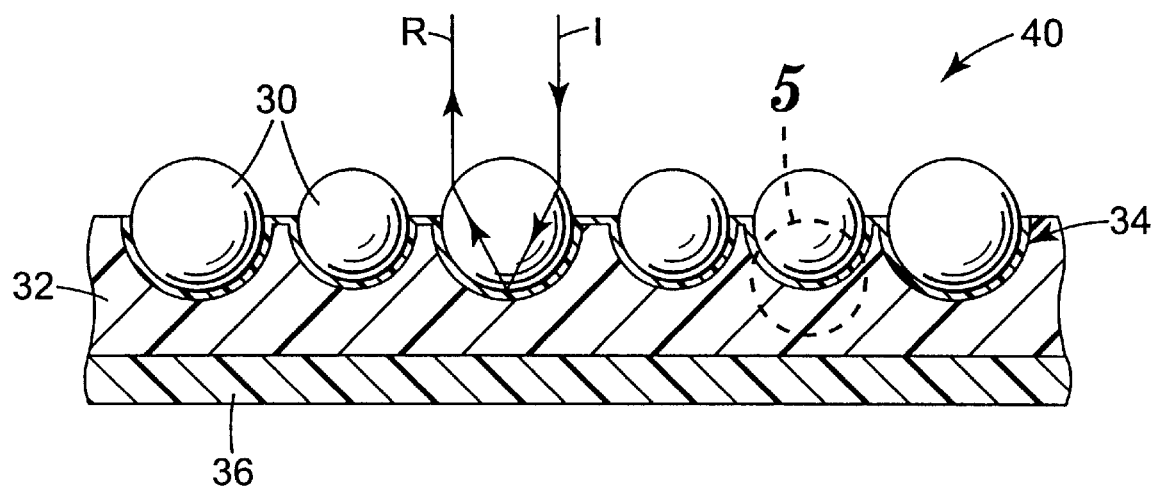
FIG. 4 is a cross-sectional schematic of a portion of a beaded retroreflective article 40 in accordance with the present invention.

FIG. 4 illustrates a beaded retroreflective article 40 that includes optical elements in the form of microspheres 30 that are partially embedded in a binder layer 32. A reflective coating 34 is disposed between the layer of microspheres 30 and the binder layer 32. Optional substrate layer 36 can be used to add structural support. The beaded retroreflective article 40 as configured in FIG. 4 is typically referred to as an "exposed lens" beaded retroreflective article. An "exposed lens" sheeting is one where the optical elements, in this case microspheres, are exposed to the ambient environment, namely air. Optionally, a protective layer (not shown) that covers or encapsulates the exposed portions of the microspheres can also be provided to make "enclosed lens" or "encapsulated lens" beaded retroreflective sheeting. Examples of exposed lens sheetings are described in the following U.S. Pat. Nos. 5,812,317; 4,763,985; and 3,700,478. Examples of encapsulated lens products are shown in U.S. Pat. Nos. 5,784,198; 5,066,098; and 4,896,943. As shown in FIG. 4, incident light I that enters a microsphere can be refracted toward the center of the microsphere, reflected off the reflective coating 34 behind the microsphere, and redirected out of the microsphere in the general direction of the incident light, as indicated by reflected light beam R.

The microspheres used in a beaded product of the invention preferably are substantially spherical in shape to provide uniform and efficient retroreflection. The microspheres preferably also are highly transparent to minimize light absorption so that a large percentage of incident light is retroreflected. The microspheres often are substantially colorless but may be tinted or colored in some other fashion. The microspheres may be made from glass, a non-vitreous ceramic composition, or a synthetic resin. In general, glass and ceramic microspheres are preferred because they tend to be harder and more durable than microspheres made from synthetic resins. Examples of microspheres that may be useful in this invention are disclosed in the following U.S.

Pat. Nos. 1,175,224; 2,461,011; 2,726,161; 2,842,446; 2,853,393; 2,870,030; 2,939,797; 2,965,921; 2,992,122; 3,468,681; 3,946,130; 4,192,576; 4,367,919; 4,564,556; 4,758,469; 4,772,511; and 4,931,414.

The microspheres typically have an average diameter of about 10 to 500 µm, and preferably of about 20 to 250 µm. Microspheres smaller than these ranges tend to provide lower levels of retroreflection, and microspheres larger than these ranges may impart an undesirably rough texture to the retroreflective article or may undesirably reduce its flexibility when flexibility is a desired property. Microspheres used in the present invention typically have a refractive index of about 1.2 to 3.0, preferably about 1.6 to 2.7, and more preferably about 1.7 to 2.5.

Figure 5:
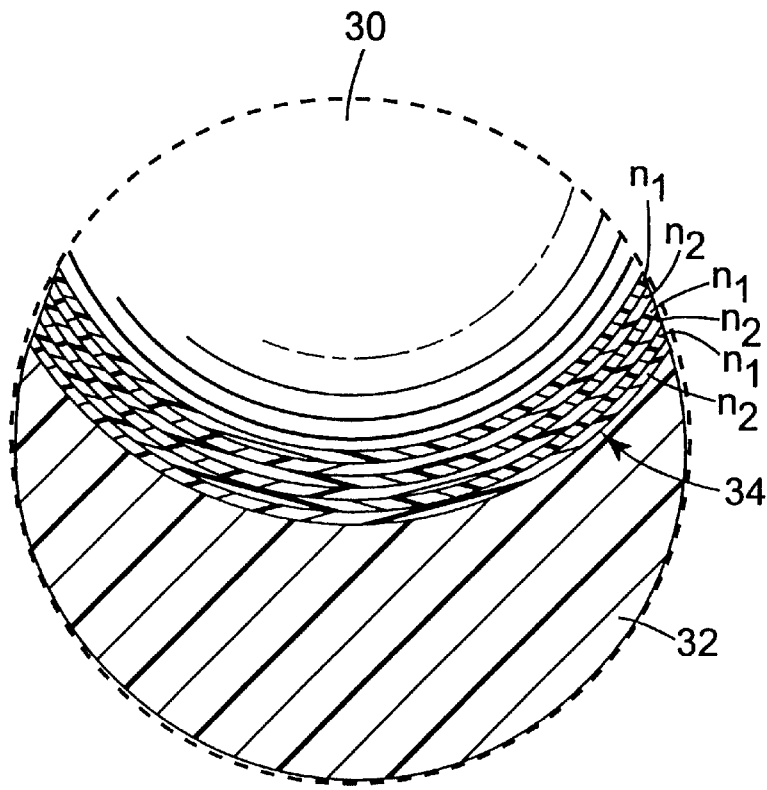
FIG. 5 is an enlarged view of a portion of a microsphere element 30 taken from region 5 of FIG. 4.

FIG. 5 shows a magnified view of a portion of the microsphere element 30 indicated by region 5 in FIG. 4. Reflective coating 34 has multiple polymer layers, which in this instance is made up of six layers arranged as alternating layers of two different materials, at least one of which is a polymer, the layers having different refractive indices $n_1$ and $n_2$. As in the cube-corner retroreflected article described above, the six alternating layers of two different materials as shown in FIG. 5 are merely illustrative. In general, a multiple layer reflective coating that has two or more layers representing two or more different refractive indices can be used. As discussed above, the reflective coating preferably has 2 to 200 layers, and more preferably 2 to 50 layers. Basically, what has been said above regarding the reflective coating 14 in the cube-corner retroreflective article 10 is likewise applicable to reflective coating 34, and vice versa. For good conformance to the profile of the microspheres, it is preferred that each layer be thin relative to the microsphere diameters. The individual layers in the multilayer coating have thicknesses of less than about 10% of the microsphere diameters, more preferably less than about 5% of the microsphere diameters.

Without reference to specific types of optical elements, the individual polymer layers of the reflective coating typically have thicknesses that are less than 10% of the average size of the optical elements of the retroreflective article. Preferably, the individual polymer layers have thicknesses that are less than 5% the average size of the optical elements. Without regard to the dimensions of the optical elements, the polymer layers preferably have thicknesses of less than 3 µm, more preferably less than 2 µm, and even more preferably less than 1 µm.

Preferably, each layer of the reflective coating is clear or essentially colorless to minimize light absorption and maximize light reflection, however, a great variety of visual effects may be achieved, if desired, when one or more of the layers are colored, such as with a dye. Such coloring agent, if provided, preferably leaves the reflective coating substantially transparent.

Figure 6:
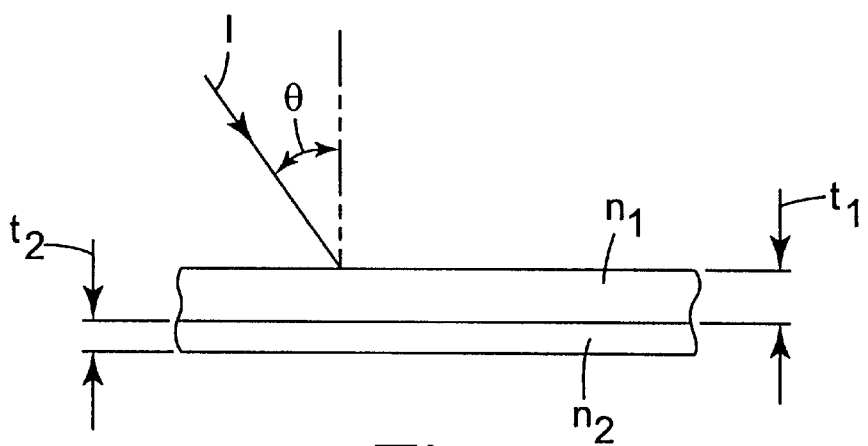
FIG. 6 is a schematic representation of adjacent layers in a multilayer reflective coating 34 useful in the present invention.

As mentioned above, the individual layers of the multilayer reflective coating disposed on retroreflective articles according to the present invention preferably have thicknesses that are appropriate for reflection of light in a desired wavelength range. In general and according to known optics, light having wavelengths within a desired wavelength range can be reflected when the combined optical thickness of two adjacent layers that have different indices of refraction is an odd multiple of one-half of a wavelength in the desired wavelength range. FIG. 6 indicates the relationship between layer thickness, index of refraction, and angle of incidence for an arbitrary incident light ray I. For light incident perpendicular to the surface of the layers (normal incidence), the combined optical thickness of the adjacent layers is simply $n_1t_1+n_2t_2$, where n is the index of refraction, t is the thickness, and the subscript denotes the layer. For light incident at an angle θ measured from a line perpendicular to the surface of the layers, a more general approximation of the combined optical thickness of adjacent layers can be given by $(n_1t_1+n_2t_2)/\cos\theta$. This approximation improves for small θ, and is best for θ less than about 20°.

The difference in refractive index between adjacent layers can affect the reflectivity of the multilayer reflective coating. In general, the larger the difference between $n_1$ and $n_2$, the stronger the reflection from the pair of layers. Preferably, in the multilayer reflective coating of the present invention, adjacent layers have indices of refraction that differ by at least 0.02, and more preferably by at least 0.05 or more, and still more preferably by at least 0.1 or more. Due to materials considerations, the difference in refractive index for adjacent polymer layers is typically less than about 1.2, and more typically less than 1, although higher refractive index differences might be achieved, and are contemplated for use in this invention, depending on the materials used.

Generally, higher refractive indices can be obtained using non-polymer materials, such as certain metallic, inorganic, organometallic, and ceramic materials, than can be obtained for polymeric materials. For example, materials with a relatively high refractive index for visible light include PbO (index of 2.61), SiC (index of 2.68), $TiO_2$ (index of 2.71), and PbS (index of 3.91). These values can be compared with typical polymeric materials with refractive indices that range from about 1.3 to 1.7. Thus, refractive index differences of more than 1.2, or even more than 2, can be obtained in some instances when non-polymer layers are placed adjacent to polymer layers in the reflective coating. Examples of non-polymer inorganic and inorganic dielectric materials that may be used include: high index materials such as CdS, $CeO_2$, CsI, GeAs, Ge, InAs, InP, InSb, $ZrO_2$, $Bi_2O_3$, ZnSe, ZnS, $WO_3$, PbS, PbSe, PbTe, RbI, Si, $Ta_2O_5$, Te, and $TiO_2$; and low index materials such as $Al_2O_3$, $AlF_3$, $CaF_2$, $CeF_2$, LiF, $MgF_2$, $Na_3AlF_6$, $ThOF_2$, and $SiO_2$.

The number of layers in the multilayer reflective coating can also affect reflectivity. More layers can generally improve reflectivity, although two or more layers are suitable for use in the present invention. In general, as the average refractive index difference between adjacent layers is increased, fewer layers can be used to achieve similar results. The number and thickness of layers can also affect the coloration of the reflection from the multilayer reflective coating. For example, when more than two layers are used, the optical thickness of some layers can be varied relative to the optical thickness of other layers. By varying optical thicknesses in the layers of the reflective coating, different pairs of adjacent layers can be made to reflect light in different wavelength bands so that an overall broader range of wavelengths can be reflected by the reflective coating as a whole. For applications where it is desirable to reflect most of the light in the visible spectrum (that is, light having wavelength of about 380 nanometers (nm) to about 750 nm), the optical thickness of adjacent layers can be varied so that overlapping wavelength bands can be reflected to substantially cover a desired portion of the visible spectrum.

In other embodiments, a particular coloration of reflected light might be desirable, and in that case the optical thickness of adjacent layers that have different indices of refraction can be selected to substantially reflect light in a desired wavelength band (or bands) and to substantially transmit light outside of the desired wavelength band (or bands). In these applications, a more intense reflection of light in a desired wavelength band (and a better transmission of light outside the desired wavelength band) can typically be obtained by using more layers in the multilayer reflective coating, preferably 5 or more layers, more preferably 10 or more layers.

Retroreflective articles that have multilayer reflective coatings according to the present invention that selectively reflect light of certain wavelengths or wavelength bands can be used to retroreflect desired wavelengths uniformly over the entire article as well as to retroreflect different wavelengths or wavelength bands from different areas of the article. For example, the distribution of layer thicknesses and indices of refraction in a reflective coating on one portion of a retroreflective article can be made different from the distribution of layer thicknesses and indices of refraction in a reflective coating on another portion of the same retroreflective article. In this way, the light reflected from different areas of the retroreflective article can have a different coloration or intensity. This can be useful, for example, when the areas of different coloration or intensity form graphic images, letters, words, characters, or other indicia. The terms "coloration" and "color" have been used here for convenience and can denote selected wavelengths of invisible light (i.e., infrared radiation, ultraviolet radiation, and so on) as well as visible light.

A variety of layer patterns can be used to form multilayer reflective coatings on retroreflective articles according to the present invention. For example, FIGS. 3 and 5 show multilayer reflective coatings made up of alternating layers of two different materials, thereby forming a pattern (i.e., A,B,A,B, . . . ). Other layer patterns can also be used, including those involving three-component systems (e.g., A,B,C,A,B,C . . . , A,B,C,B,A,B,C,B, . . . , and others), other multi-component systems, as well as systems where no overall pattern exists. Layer variations include index of refraction variations (i.e., variations in materials) as well as thickness variations to achieve the desired arrangement of combined optical thickness among adjacent layers. In addition, as indicated above, optional inorganic and/or non-polymer layers can be included in the multilayer reflective coating, for example adjacent to or between multiple polymer layers. These optional layers can include metals, metal oxides, inorganic dielectrics (such as various oxides, nitrides, sulfides, and others), ceramic materials, organometallics, and other such non-polymer materials. Such individual layers are generally capable of transmitting light on their own, but when combined with other layers of different refractive indices, allow a coating to be produced which as a whole is capable of reflecting light. Generally, any combination of such thin multiple layers which includes at least two polymer layers and which allows light to be reflected is contemplated by the invention. Examples of other suitable layers are described in U.S. Pat. Nos. 4,763,985 and 3,700,305.

The polymer layers used in the reflective coating can be disposed in optical association with optical elements of retroreflective articles using methods now known or later developed which are suitable for disposing multiple layers of polymeric materials that have desired thicknesses and indices of refraction. Such methods can include solvent-borne coating methods, liquid reactive coating methods, extrusion coating methods, gravure coating methods, physical and chemical vapor deposition methods, plasma deposition methods, film lamination methods, and the like. In general, these methods involve coating each layer in a sequential fashion. Some methods, however, are also amenable to simultaneous disposition of multiple layer stacks. For example, multiple polymer layers can be coextruded as a multiple layer stack onto retroreflective articles. Alternatively, pre-formed polymer multilayer films can be laminated to retroreflective articles, for example by using heat and/or pressure to conform a multilayer polymer film to the optical elements of the retroreflective article.

Multilayer reflective coatings can be provided in optical association with the optical elements of retroreflective articles in a substantially continuous fashion across the entire retroreflective area of the retroreflective articles. Alternatively, multilayer reflective coatings can be formed in a discontinuous fashion to optically associate one or more multilayer coatings with one or more selected portions of the layer of optical elements. This can be done, for example, by layer deposition through a mask and/or subsequent removal of the coating material from undesired portions. See, for example, International Publication WO 95/31739 (corresponding to U.S. patent application Ser. No. 09/140, 083).

Exemplary methods of coating multiple polymer layers include the pre-polymer vapor deposition methods taught in co-filed and co-pending U.S. patent application Ser. No. 09/259,487, (attorney docket no. 54168USA6A entitled "Method of Coating Microstructured Substrates with Polymeric Layer(s), Allowing Preservation of Surface Feature Profile"), the disclosure of which is wholly incorporated by reference into this document. Briefly, these methods involve condensing a pre-polymer vapor onto a structured substrate, and curing the material on the substrate. These methods can be used to form polymer coatings that have controlled chemical composition and that preserve the underlying profile of the structured substrate. Multiple coatings of the same or different material can be applied in this fashion to form multiple polymer layers in a multilayer reflective coating. This method provides the capability to form uniform coatings of desired thickness in optical association with the optical elements of retroreflective articles using a wide range of materials.

Figure 7:
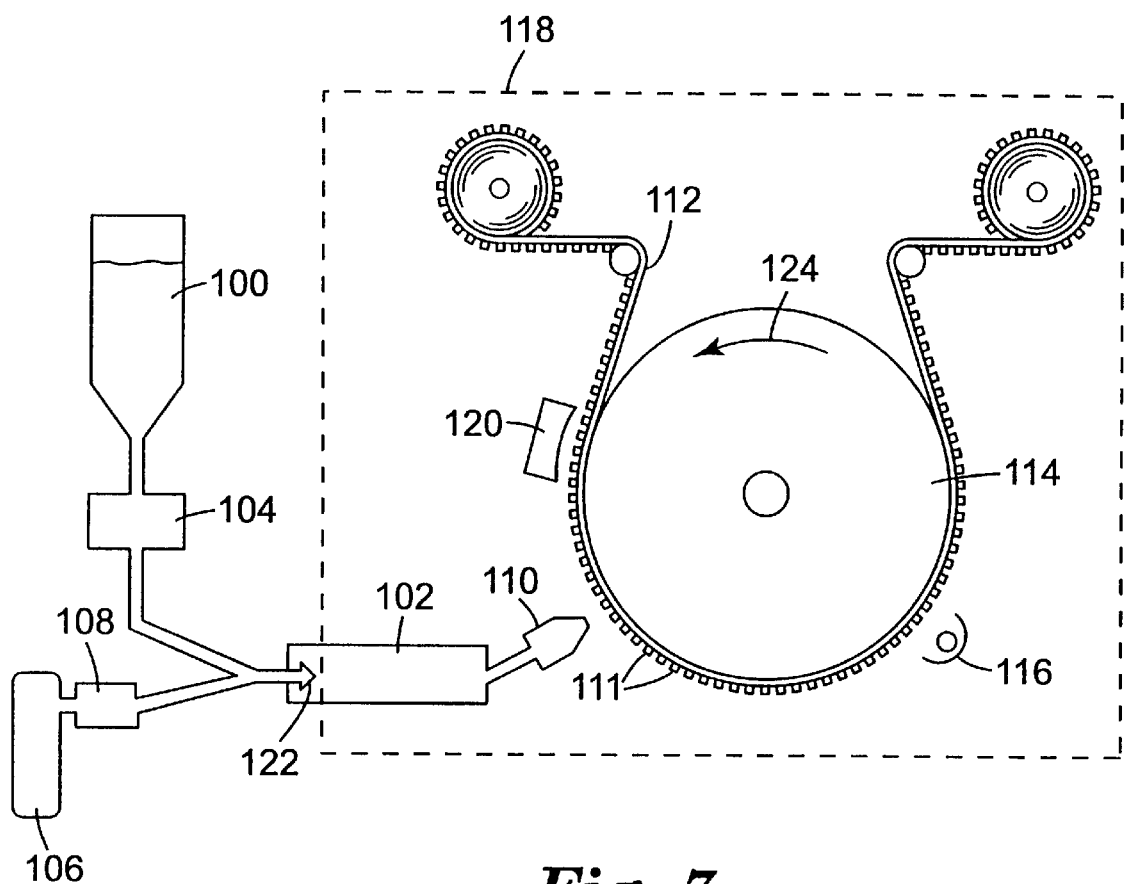
FIG. 7 is a schematic representation of a coating method useful in the present invention.

Preferred methods of making multilayer polymer coatings in optical association with the optical elements of retroreflective articles can include aspects of the coating process shown in FIG. 7. The process can be performed at atmospheric pressure, optionally enclosing the coating region in a chamber 118 (e.g., for providing a clean environment, for providing an inert atmosphere, or for other such reasons), or at reduced pressure where chamber 118 is a vacuum chamber. Coating material 100, supplied in the form of a liquid monomer or pre-polymer, can be metered into evaporator 102 via pump 104. As described in detail below, the coating material 100 can be evaporated by one of several techniques, including flash evaporation and carrier gas collision vaporization. Preferably, the coating material can be atomized into fine droplets through optional nozzle 122, the droplets being subsequently vaporized inside evaporator 102. Optionally, a carrier gas 106 can be used to atomize the coating material and direct the droplets through nozzle 122 into evaporator 102. Vaporization of the liquid coating material, or droplets of the liquid coating material, can be performed via contact with the heated walls of the evaporator 102, contact by the optional carrier gas 106 (optionally heated by heater 108), or contact with some other heated surface. Any suitable operation for vaporizing the liquid coating material is contemplated for use in this invention.

After vaporization, the coating material 100 can be directed through a coating die 110 and onto the optical elements 111 of retroreflective article 112. A mask (not shown) can optionally be placed between the coating die 110 and the retroreflective article 112 to coat selected portions of the optical elements 111. Optionally, the surfaces of the optical elements 111 can be pretreated using an electrical discharge source 120, such as a glow discharge source, silent discharge source, corona discharge source, or the like. The pretreatment step is optionally performed to modify the surface chemistry, for example, to improve adhesion of coating material to the retroreflective article, or for other such purposes. In addition, the surfaces of the optical elements 111 can optionally be pretreated with an adhesion promoter, as discussed below.

Retroreflective article 112 is preferably maintained at a temperature at or below the condensation temperature of the monomer or pre-polymer vapor exiting the coating die 110. Retroreflective article 112 can be placed on, or otherwise disposed in temporary relation to, the surface of drum 114. The drum 114 allows the retroreflective article 112 to be moved past the coating die 110 at a selected rate to control the layer thickness. The drum 114 can also be maintained at a suitable bias temperature to maintain the retroreflective article 112 at or below the pre-polymer vapor's condensation temperature.

After being applied on the optical elements 111, the coating material can be solidified. For coating materials containing radiation-curable or heat-curable monomers, a curing source 116 can be provided downstream to the coating die 110 in the drum rotation direction (indicated by arrow 124). Any suitable curing source is contemplated by this invention, including electron beam sources, ultraviolet lamps, electrical discharge sources, heat lamps, and the like.

A reflective coating that has two or more different polymer layers can be disposed in optical association with the optical elements 111 of a retroreflective article 112 by supplying at least a second coating material (not shown). After condensing the first coating material on the optical elements 111, a second coating material can be condensed on a previously deposited layer or layers, preferably after the previously deposited layer or layers have been cured. Addtional coating materials can be deposited as desired. Optionally, inorganic, organometallic, and/or non-polymer layers can also be deposited using suitable methods, now known or later developed, including sputtering, chemical vapor deposition, electroplating, condensing from a solvent, and other such methods. These optional layers may be deposited directly on the optical elements before the polymer layers are formed, after the polymer layers are formed, or between polymer layers.

A particularly preferred optional layer is an adhesion promoter coated between the optical elements of the retroreflective article and the polymer layers of the multilayer reflective coating. Adhesion promoters can be selected to improve adhesion between the multilayer reflective coating and the optical elements. For example, a silane coupling agent can be used that promote adhesion between polymer layers of the multilayer reflective coatings of the present invention and optical elements which can be, for example, glass or ceramic microspheres, molded polycarbonate cube-corner elements, or other such optical elements. Exemplary silane coupling agents include aminopropyltriethoxysilane, glycidoxypropyltrimethoxysilane, methacryloxypropyltrimethoxysilane, and vinyltrimethoxysilane. In addition, titanate coupling agents can be used as adhesion promoters, examples of which include isopropyl tri(dioctyl)phosphato titanate, dimethacryl oxoethylene titanate, and titanium(tetraisopropoxide). Silazanes such as hexamethyldisilazane can also be used as adhesion promoters. Examples of silane coupling agents are disclosed in U.S. Pat. No. 5,200,262 to Li.

Apparatuses suitable for carrying out various aspects of the method illustrated in FIG. 7 are described in co-filed and co-pending U.S. patent application Ser. No. 09/259,487 (attorney docket no. 54168USA6A entitled "Method of Coating Microstructured Substrates with Polymeric Layer (s), Allowing Preservation of Surface Feature Profile"), in International Applications US 98/24230 (corresponding to U.S. patent application Ser. No. 08/980,947) and US 98/22953 (corresponding to U.S. patent application Ser. No. 08/980,948), and in U.S. Pat. Nos. 4,722,515; 4,842,893; 4,954,371; 5,097,800; and 5,395,644. In particular, an apparatus that may be suitable for carrying out certain aspects of the method illustrated in FIG. 7 under vacuum conditions is commercially available on a custom-built basis from Delta V Technologies, Inc, Tucson, Ariz. Apparatuses and portions of apparatuses that may be suitable for carrying out these and other aspects of the method illustrated in FIG. 7 are described in more detail in the cited documents.

Exemplary monomers and oligomers suitable for use in the process shown in FIG. 7 include acrylates, methacrylates, acrylamides, methacrylamides, vinyl ethers, maleates, cinnamates, styrenes, olefins, vinyls, epoxides, silanes, melamines, hydroxy functional monomers, and amino functional monomers. Suitable monomers and oligomers can have more than one reactive group, and these reactive groups may be of different chemistries on the same molecule. Pre-polymers can be mixed to achieve a broad range of optical properties such as index of refraction in the layers of the reflective coating. It can also be useful to coat reactive materials from the vapor phase onto a substrate already having chemically reactive species on its surface, examples of such reactive species being monomers, oligomers, initiators, catalysts, water, or reactive groups such as hydroxy, carboxylic acid, isocyanate, acrylate, methacrylate, vinyl, epoxy, silyl, styryl, amino, melamines, and aldehydes. These reactions can be initiated thermally or by radiation curing, with initiators and catalysts as appropriate to the chemistry or, in some cases, without initiators or catalysts. When more than one pre-polymer starting material is used, the constituents may be vaporized and deposited together, or they can be vaporized from separate evaporation sources.

The deposited pre-polymer materials can be applied in a substantially uniform, substantially continuous fashion, or they can be applied in a discontinuous manner, for example, as islands that cover only a selected portion or portions of the optical elements. Discontinuous applications can be provided in the form of characters, numerals, or other indicia by using, for example, a mask or other suitable techniques, including subsequent removal of undesired portions.

Pre-polymer vapor deposition is particularly useful for forming thin films having a thickness of about 0.01 micrometers ($\mu$m) to about 50 $\mu$m. Thicker layers can be formed by increasing the exposure time of the substrate to the vapor, by increasing the flow rate of the fluid composition to the atomizer, or by exposing the substrate to the coating material over multiple passes. Increasing the exposure time of the retroreflective article to the vapor can be achieved by adding multiple vapor sources to the system or by decreasing the speed at which the article travels through the system. Layered coatings of different materials can be formed by sequential coating depositions using a different coating material with each deposition, or by simultaneously depositing materials from different sources displaced from each other along the substrate travel path.

After condensing the material on the article, the liquid monomer or pre-polymer layer can be cured. Curing the material generally involves irradiating the material on the substrate using visible light, ultraviolet radiation, electron beam radiation, ion radiation and/or free radicals (as from a plasma), or heat or any other suitable technique. When the article is mounted on a rotatable drum, the radiation source preferably is located downstream from the monomer or pre-polymer vapor source so that the coating material can be continuously applied and cured on the surface. Multiple revolutions of the substrate then continuously deposit and cure monomer vapor onto layers that were deposited and cured during previous revolutions. This invention also contemplates that curing occur simultaneously with condensing, for example, when the optical elements have a material that induces a curing reaction as the liquid monomer or pre-polymer material contacts the surface. Thus, although described as separate steps, condensing and curing can occur together, temporally or physically.

Table I lists a few examples of polymer and pre-polymer materials that can be disposed in optical association with the optical elements of retroreflective articles using various methods. The known refractive index of the monomer and/or the polymer made from the monomer is given for each material. Different refractive indices can be achieved by choosing these or other starting materials that either have a desired refractive index or that can be mixed with one or more other materials to obtain a desired refractive index.

TABLE I

| Polymer or pre-polymer material | Supplier of monomer | Refractive index (monomer) | Refractive index (polymer) |
| --- | --- | --- | --- |
| Poly(vinyl naphthalene) | Aldrich (Milwaukee, WI) | — | 1.6818 |
| Poly(styrene) | Aldrich | 1.547 | 1.592 |
| Poly(lauryl methacrylate) | Aldrich | 1.445 | 1.474 |
| Poly(trimethyl cylclohexyl methacrylate) | Aldrich | 1.456 | 1.485 |
| Poly(pentafluoro-styrene) | Aldrich | 1.406 | — |
| Poly(trifluoroethyl methacrylate) | Aldrich | 1.361 | 1.437 |
| Poly(dibromopropene) | Aldrich | 1.5573 | — |
| Poly(benzyl methacrylate) | Aldrich | 1.512 | 1.568 |
| Poly(ethylene glycol phenyl ether acrylate) | Aldrich | 1.518 | — |
| Poly(pentadecafluoro-octyl acrylate) | 3M (St. Paul, MN) | 1.328 | 1.339 |
| Poly(ortho-sec-butyl dibromophenyl acrylate) | 3M | 1.562 | 1.594 |
| Ethoxylated trimethylol-propane triacrylate | Sartomer (Exton, PA) | 1.4695 | — |
| Tris(2-hydroxy ethyl) isocyanurate triacrylate | Sartomer | 1.4489 | — |
| Ethoxylated Bisphenol A diacrylate | Sartomer | 1.4933 | — |
| 1,6 hexanediol diacrylate | Sartomer | 1.456 | — |
| Isooctyl acrylate | Sartomer | 1.4346 | — |
| Isobornyl acrylate | Sartomer | 1.4738 | — |
| Tripropylene glycol diacrylate | Sartomer | 1.44 | — |

Other polymers that may be suitable are disclosed in co-filed and co-pending U.S. patent application Ser. No. 09/259,487 (entitled "Method of Coating Microstructured Substrates with Polymeric Layer(s), Allowing Preservation of Surface Feature Profile").

EXAMPLE

Advantages and objects of this invention are further illustrated in the Example set forth hereafter. It is to be understood, however, that while the Example serves this purpose, the particular ingredients and amounts used and other conditions recited in the Example are not to be construed in a manner that would unduly limit the scope of this invention. The Example selected for disclosure is merely illustrative of how to make various embodiments of the invention and how the embodiments generally perform.

Glass microspheres that had an average diameter of 40 to 90 µm and that had a refractive index of 1.93 were partially embedded into a temporary carrier sheet, forming a substrate referred to as a beadcoat carrier. The beadcoat carrier was taped onto the chilled steel drum of a monomer vapor coating apparatus such as described in U.S. Pat. No. 4,842,893. The apparatus used a flash evaporation process to create a pre-polymer vapor that was coated using a vapor coating die. The vapor coating die directed the coating material onto the beadcoat carrier. The beadcoat carrier was mounted such that rotation of the drum exposed the embedded microspheres to, in order, a plasma treater, the vapor coating die, and an electron beam curing head. The deposition took place in a vacuum chamber.

Alternating layers of sec-butyl(dibromophenyl acrylate) (SBBPA), as described in International Publication WO 98/50805 (corresponding to U.S. patent application Ser. No. 08/853,998), and tripropylene glycol diacrylate (TRPGDA) were evaporated and condensed onto the beadcoat carrier while the chilled steel drum was maintained at −30° C. The SBBPA monomer had an index of refraction of about 1.56 and the TRPGDA monomer had an index of refraction of about 1.44. The drum rotated to move the sample past the plasma treater, vapor coating die, and electron beam curing head at a speed of 38 meters per minute (m/min). A nitrogen gas flow of 570 milliliters per minute (ml/min) was applied to the 2000 Watt plasma treater. The room temperature TRPGDA liquid flow was 1.2 ml/min, and the heated SBBPA liquid flow was 1.1 ml/min. The monomer evaporator was maintained at 295° C., and the vapor coating die was 285° C. The vacuum chamber pressure was $2.2 \times 10^{-4}$ Torr. The electron beam curing gun used an accelerating voltage of 7.5 kV and 6 milliamps current. The alternating layers were applied by opening the SBBPA monomer flow valve at the monomer pump for one drum revolution then closing the SBBPA monomer flow valve and simultaneously opening the TRPGDA monomer flow valve for the next revolution.

This procedure was repeated for 60 alternating layers, each layer being cured before the next layer was deposited. The beadcoat carrier coated with the 60 alternating layers was then coated with about 0.7 millimeters (mm) of a rapid-curing, general purpose epoxy adhesive as sold by ITW Devcon, Danvers, Mass., under the trade designation POLYSTRATE 5-MINUTE EPOXY. The epoxy was allowed to cure at ambient conditions for 1 hour before stripping away the beadcoat carrier to give a retroreflective article that had a layer of glass microspheres and a multi-layer reflective coating comprising 60 alternating polymer layers disposed behind the microspheres.

As a comparative example, glass microspheres were embedded into a beadcoat carrier and were coated with about 0.7 mm of the same epoxy without vapor depositing polymer layers onto the microspheres. The carrier sheet was stripped away after curing the epoxy for 1 hour. The retroreflectance of the Example and the comparative example were evaluated by measuring the percentage of incident light that was retroreflected by the samples. The measurements were performed as a function of wavelength for light in the visible spectrum (wavelengths of 400 nm to 800 nm). The retroreflectance from the Example that had the multilayer reflective coating was about a 2.5% to 3.5% throughout the range of wavelengths whereas the comparative sample without the multilayer reflective coating had about a 1.5% reflectance throughout the range. This indicated that the multilayer polymer coating acted as a reflector and improved the retroreflectivity relative to the comparative example.

All of the patents and patent applications cited are incorporated into this document in total as if reproduced in full.

This invention may be suitably practiced in the absence of any element not specifically described in this document.

Various modifications and alterations of this invention will be apparent to one skilled in the art from the description herein without departing from the scope and spirit of this invention. Accordingly, the invention is to be defined by the limitations in the claims and any equivalents thereto.

What is claimed is:

1. A retroreflective article that comprises:

a layer of optical elements; and a reflective coating that is disposed in optical association with the optical elements, the reflective coating comprising a plurality of layers wherein (i) at least two adjacent layers have different refractive indices, and (ii) the reflective coating includes one or more polymer layers that each have an average thickness that is less than about 10% of an average size of the optical elements, wherein the reflective coating has a first portion and a second portion, the first portion of the reflective coating having adjacent layers that have different indices of refraction and optical thicknesses selected to redirect light in a first selected wavelength band from a first area of the retroreflective article, and the second portion of the reflective coating having adjacent layers that have different indices of refraction and optical thicknesses selected to redirect light in a second selected wavelength band from a second area of the retroreflective article.

2. The retroreflective article of claim 1, wherein the first and second portions of the reflective coating form a character, numeral, or indicium.

3. A retroreflective article that comprises:

a layer of optical elements; and a reflective coating that is disposed in optical association with the optical elements, the reflective coating comprising a plurality of layers wherein (i) at least two adjacent layers have different refractive indices, and (ii) the reflective coating includes one or more polymer layers that each have an average thickness that is less than about 10% of an average size of the optical elements; and an adhesion promoter disposed between the layer of optical elements and the reflective coating.

4. The retroreflective article of claim 3, wherein the adhesion promoter is a silane coupling agent.

* * * * *